United States Patent [19]

Newton et al.

[11] 3,773,544
[45] Nov. 20, 1973

[54] FLUOROCARBON POLYMER COATED SUBSTRATE

[75] Inventors: Dennis Sydney Newton, Swansea; Peter David Winchcombe, Skewen, both of Wales

[73] Assignee: British Steel Corporation, London, England

[22] Filed: June 1, 1971

[21] Appl. No.: 148,904

[30] Foreign Application Priority Data
June 2, 1970 Great Britain.................. 26,605/70

[52] U.S. Cl................... 117/49, 117/71 M, 117/72, 117/75, 117/118, 117/132 CF, 204/38 R
[51] Int. Cl.............................................. B44d 1/092
[58] Field of Search................. 117/49, 75, 132 CF, 117/118, 71 M, 72

[56] References Cited
UNITED STATES PATENTS
3,671,205  6/1972  Uchida et al. ........................ 117/49
3,279,936  10/1966  Forestek ............................... 117/49
3,031,333  4/1962  Shuster et al. ........................ 117/49
3,340,216  9/1967  Mack et al..................... 117/132 CF
3,480,483  11/1969  Wilkinson..................... 117/132 CF Primary Examiner—William D. Martin
Assistant Examiner—Janyce A. Bell
Attorney—Sughrue, Rothwell, Mion, Zinn & Macpeak

[57] ABSTRACT

A process for preparing a fluorocarbon polymer coated substrate includes heating a surface coating containing a fluorocarbon polymer and a copolymer based on vinylidene chloride, the surface coating being on a priming coating containing chromium oxide, or chromium oxide with chromium, such that the heating decomposes the copolymer to etch the priming coating to key the fluorocarbon polymer to the priming coating.

20 Claims, No Drawings

FLUOROCARBON POLYMER COATED SUBSTRATE

This invention relates to a coated substrate. More particularly, it concerns a substrate coated with a fluorocarbon polymer.

In coating technology, it is known that it is difficult to achieve satisfactory bonds between fluorocarbon polymers and substrates. This is especially so with coatings of polytetrafluoroethylenes or polyvinylidenefluorides. For example, it has been quite common for coatings of polytetrafluoroethylenes to peel or strip from items of bakewear. Indeed, with some substrates such as mild steel or galvanised steels, it has not been possible to get a polytetrafluoroethylene or polyvinylidenefluoride as such to adhere.

It has now been found that a good adherent coating of a fluorocarbon polymer can be obtained by using a substrate having a priming coating containing chromium oxide, or chromium oxide with chromium.

According to one aspect of the present invention, a process for preparing a fluorocarbon polymer coated substrate includes heating a surface coating containing a fluorocarbon polymer and a copolymer based on vinylidene chloride, the surface coating being on a priming coating on a substrate, the priming coating containing chromium oxide, or chromium oxide with chromium, such that the heating decomposes the copolymer to etch the priming coating to key the fluorocarbon polymer to the priming coating. This aspect of the invention also includes the final coated substrate.

Insofar as the final coated substrate is believed to be novel as such, a further aspect of the invention is a fluorocarbon polymer coated substrate, in which the fluorocarbon polymer is keyed to an etched surface of a priming coating containing chromium oxide, or chromium oxide with chromium.

The heating to decompose the vinylidene chloride copolymer may be carried out in the range 340° to 370°C. This may follow any heating required to give a dry coating containing the copolymer and the fluorocarbon polymer, for instance when an aqueous dispersion of a polytetrafluoroethylene and the copolymer has been used. The heating at 340° to 370°C is preferably stopped when the copolymer has fully decomposed, as shown by acidic vapours no longer being evolved. This is because the decomposition should be completed to avoid subsequent decomposition of the copolymer occurring during use of the final coated substrate at elevated temperatures.

Any fluorocarbon polymer may be used for the invention. Examples of such polymers which are commercially available are polytetrafluoroethylenes, copolymers of tetrafluoroethylene and hexafluoropropylene, polychlorotrifluoroethylenes, and polyvinylidene fluorides. The invention is of particular interest for polytetrafluoroethylenes, in view of their exceptional non-stick properties.

A flurocarbon polymer and a copolymer based on vinylidene chloride may be applied together from a fluid dispersion containing these polymers and a liquid that may be volatilised by heat. In such a dispersion, the fluorocarbon polymer may be dispersed in the liquid, which will also contain the copolymer as a dispersion and/or solution. The liquid may be water or any organic fluid in which the fluorocarbon polymer and the copolymer may be satisfactorily fluidised. Examples of such an organic liquid are alcohols, ethers, aliphatic and aromatic hydrocarbons, chlorinated hydrocarbons, esters and ketones. Water is preferred because of its non-flammability and for economic reasons. Codispersions in water may be prepared by mixing an aqueous dispersion of the fluorocarbon polymer with an aqueous dispersion of the vinylidene copolymer.

A stable dispersion in general may require a surface active agent, for example as described in U.K. Pat. Specifications 689,400 and 821,353. The fluid dispersion may be applied in any convenient way to the priming coating. For example, the application can be by dipping, spraying, brushing, rolling (especially reverse rolling), air-knife, or doctor-knife. Multiple applications are possible, preferably with drying between them. However, single applications may be more convenient if continuous coatings are to be ensured. The applied dispersion is preferably dried before the vinylidene chloride copolymer is decomposed, to minimise the risk of too rapid a removal of the volatile liquid producing a ruptured dried coating. The fluid dispersions may contain other ingredients. For example, they may contain fillers, pigments, dyes, stabilisers, thickeners, and flow improvers.

Dispersion of polytetrafluoroethylenes and vinylidene chloride copolymers and their preparation are described in the U.K. Pat. Specifications 1,061,126; 1,011,500 and 1,007,050 of Imperial Chemical Industries Limited. This description, so far as it is relevant, is incorporated into the present specification. In particular, there is incorporated from U.K. Pat. Specification 1,061,126, a dispersion in a liquid that may be volatilised (preferably water) of a polytetrafluoroethylene and a vinylidene chloride copolymer, the ratio of the weights of the polytetrafluoroethylene and the copolymer being in the range of 9:1 to 1:19, and the copolymer corresponding to 95 to 70 percent by weight of vinylidene chloride and 5 to 30 percent by weight of copolymerisable ethylenically unsaturated monomeric material. The ratio of the weights of the polytetrafluoroethylene and a vinylidene chloride copolymer asre preferably in the range 3:1 to 1:5. The combined weight of the polytetrafluoroethylene and copolymer may be 3 to 60 percent by weight of the dispersion. Also, they may both be in the disperse phase. The copolymer is preferably of vinylidene chloride, acrylonitrile, and $0.5/x$ to $5/x$ mole percent of a monomer (preferably acrylic acid) containing at least one free carboxylic acid group, where $x$ is the number of free carboxylic acid groups in the molecule of the monomer. The ethylenically unsaturated monomeric material for copolymerisation with the vinylidene chloride may be selected from (a) monethylenically unsaturated mono and poly-carboxylic acids and their esters, anhydrides and nitriles; (b) esters of mono or poly-carboxylic fatty acids and mono-ethylenically unsaturated alcohols; (c) halogen-substituted derivatives of ethylene; (d) mono-ethylenically unsaturated aldehydes and ketones; and (e) dienes. Particular examples within these groups (a) to (e) are (a) acrylic acid, (which is particularly preferred), α-chloroacrylic acid, methacrylic acid, maleic acid, fumaric acid, crotonic acid, mesaconic acid, aconitic acid, itaconic and their esters, anhydrides and nitriles; (b) vinyl esters of mono carboxylic fatty acids; (c) vinyl halides; (d) methacrolein and vinylmethylketone; and (e) isoprene and butadiene. Preferred dispersions are aqueous dispersions containing (a) polytetrafluoroethylene in the form of approximately spherical colloidal particles having an average diameter of 0.15 to 0.20$\mu$, conveniently prepared by the process described in Example 1 of U.K. Pat. Specification 821,353 and concentrated to 60 percent by weight of polytetrafluoroethylene by an electro-decantation process (similar to that described in U.K. Pat. Specification 642,025) and containing 6 percent by weight of a commercially available polymeric non-ionic surface active agent (conveniently an alkyl aryl polyether alcohol); and (b) a copolymer of vinylidene chloride, conveniently prepared by the process of Example 1 of U.K. Pat. Specification 1,011,500, of vinylidene chloride (conveniently 90 parts by weight), acrylonitrile (conveniently 10 parts by weight) and acrylic acid (conveniently 2 parts by weight), conveniently to give an aqueous dispersion of approximately 50 percent solids and a particle size of 0.13$\mu$. The final aqueous dispersion preferably contains 45 to 65 percent by weight of the polytetrafluoroethylene and 55 to 35 percent by weight of the vinylidene chloride copolymer. Such a dispersion is commercially available as "Fluon MM1" ("Fluon" is a registered trade mark).

The substrate and its priming coating are chosen such that the decomposition of the vinylidene chloride copolymer does not result in loss of adhesion of the priming coating to the substrate. Therefore, if the substrate itself can be attacked by decomposition products of the vinylidene chloride copolymer, the priming coating should have an adequate thickness to mask the substrate.

The priming coating is preferably provided as an electrochemically deposited coating. For this deposition, the substrate will have been adapted, if necessary, to allow the deposition to occur. For example, the substrate may be a ceramic material having a metallised surface onto which the priming coating is deposited. The electrochemical deposition may be done such that the priming coating consists of chromium oxide in hydrated form, or such that the priming coating has a composite structure with chromium metal adjacent to the substrate and the chromium oxide in hydrated form on top. Such a coating has excellent resistance against corrosion if it has adequate thickness. An example of a steel having such a coating is a coated mild steel (so called black plate) commercially available under the trade name "Hi Top."

The electrochemical deposition may be provided by any plating electrolyte composed predominantly of chromic acid and capable of use to from a priming coating in a cathodic treatment of steel strip. Such an electrolyte is in itself conventional. Therefore, it may be any known electrolyte used for the electrodeposition of a priming coating containing chromium oxide or chromium oxide with chromium. Such an electrolyte is disclosed in for example U.K. Pat. Specifications 939,136; 1,046,434 and 1,056.357.

Electrochemical deposition to obtain chromium oxide preferably with chromium may for example be done by electrolysis in a bath of an aqueous solution containing (a) chromic acid, preferably at a concentration of 40 to 100 g/litre; (b) sulphuric acid at a concentration of preferably 0.1 to 0.5 g/litre; and (c) optionally a water soluble organic hydroxyl compound forming no precipitate in the aqueous chromic acid solution and present in such an amount that most 2.5 g/litre of trivalent chromium ion and 20 to 150 parts by weight of hexavalent chromium ion per part of trivalent chromium ion are formed. The substrate is the cathode. Such a process is described in U.K. Pat. Specification 1,056,357, and the description, so far as it is relevant, is incorporated herein. If the concentration of chromic acid is below 40 g/litre, the priming coating may have inferior formability and less corrision resistance. If the concentration is above 100 g/litre, chromium as such may be produced. The optional water soluble organic hydroxyl compound may have a simple structure that has an alcoholic hydroxyl or phenolic hydroxyl group. Examples of such a compound are monoalcohols (for instance methyl alcohol, ethyl alcohol, propyl alcohol and monoethanolomine); polyalcohols (for instance ethylene glycol, propylene glycol, glycerol, diethanolamine, triethanolamine, pentaerythritol, sorbitol, and mannitol); phenol; phenol sulphonic acids (for instance phenol - 2,4- disulphonic acid, catechol - 3,5 - disulphonic acid, phenol 2,4,6 - trisulphonic acid, 2, - napthol - 3,4- disulphonic acid, and 1,8 - dihydroxynaphthalene - 3.6 - disulphonic acid. Cresol, xylenol and polyphenols (for example catechol and hydroquinone) are not desirable, insofar as they form precipitates in the aqueous solutions of chromic acid. Preferably, at most 1 g/litre of an inorganic fluoride is also present in the bath. Examples of such a compound are hydrofluoric acid; fluorides (for instance sodium fluoride, acidic sodium fluoride, potassium fluoride, acidic potassium fluoride, ammonium fluoride, and acidic ammonium fluoride); hydrofluosilicic acid, fluosilicates ( for instance sodium fluosilicate, potassium fluosilicate, and ammonium fluosilicate); hydrofluoboric acid (HBF$_4$); fluoborates (for instance sodium fluoborate, potassium fluoborate, and ammonium fluoborate). Hydrofluoboric acid is especially preferred when the priming coating is to have the composite structure. In this case, the organic hydroxyl compound is preferably omitted. Preferred concentrations of the bath when hydrofluoboric acid is present and chromic acid, 55 to 65 g/litre; sulphuric acid, 0.25 to 0.35 g/litre; and hydrofluoroboric acid, 0.25 to 0.35 g/litre. Non-consumable anodes may be used. For example, pure lead, lead antimony alloys and lead silver alloys may be used. However, non-consumable anodes of lead/tin alloys are preferred. Current densities at preferred bath temperatures of 40° to 70°C are preferably at least 12.5 A/sq. dm., preferably at most 40 A/sq. dm. Deposition times may be 1 to 20 seconds. The final priming coating may be very thin, for example 0.05 to 1$\mu$.

The substrate may have any form. For example, it may be planar or non-planar. Examples of planar substrates are steel or other metal (for instance aluminium) sheets or coiled sheets. These may then be made up into finished articles, for example cans, closures (for instance crown capsules for bottles). Examples of non-planar substrates are items of bakeware to be rendered "non stick." The material of the substrate will be such that it will withstand heating to decompose the vinylidene chloride copolymer. This material is conveniently a metal The invention will now be illustrated by the following Example:

EXAMPLE

Two samples were cut from mild steel coated with a hydrated chromium oxide/chromium composite coating. The steel was commercially available as "Hi Top."

A reverse roll coater was then used to single coat the samples with an aqueous dispersion containing a polytetrafluoroethylene and a vinylidene chloride copolymer. The dispersion had been bought as "Fluon MM1." The coated samples were dried for 1 to 2 minutes at 170°C. They were then heated for 2 to 4 minutes at 340° to 370°C. This heating decomposed the vinylene chloride copolymer to etch the priming coating. Upon cooling, it was found that the polytetrafluoroethylene of the final product had become keyed to the priming coating.

The following table summarises the experimental procedure and results obtained:

TABLE

| Sample | Thickness of dried coating of "Fluon MM1," mm. | Heating schedule | Test on final product | |
|---|---|---|---|---|
| | | | Cross hatch (1) | Erichsen pass, mm. (2) |
| 1 | 0.3 | {2 mins. at 170° C<br>{4 mins. at 340° C | 10 | 9 |
| 2 | 0.5 | {2 mins. at 170° C<br>{4 mins. at 340° C | 10 | 9 |

1. The "cross hatch" test

This is a test for adhesion. A 2.54 cm square (1 in square) of the final product was scratched on its coated surface with lines at right angles. The lines were at every 2.54 mm (0.1 in), and divided the sample into a grid of 100 smaller squares. Clear adhesive cellulose tape of the kind available under the registered trade mark "Sellotape" was pressed into the sample and then ripped off. The number of smaller squares remaining divided by 10 was recorded as the test result, the better the adhesion of the polytetrafluoroethylene, the higher the result. The values 10 obtained indicated there was excellent adhesion.

2. The "Erichsen" test

This is in part an adhesion test. A 7.62 cm square (3 in square) of the final product was intended in a standard Erichsen machine. Indenting was continued until rupture of the metal of the square occurred. The depth of the indentation at this stage was recorded in mm. The metal rupture occurred at a depth of 9 mm. However, the coating had not ruptured (i.e., it passed 9 mm), and it had not come away from the metal. This absence of delamination indicated excellent adhesion and extensibility of the polytetrafluoroethylene.

We claim:

1. A process for preparing a fluorocarbon polymer coated substrate, including heating a surface coating containing a fluorocarbon polymer and a copolymer of vinylidene chloride and an ethylenically unsaturated monomer copolymerizable therewith in a weight ratio of from 9:1 to 1:19 of said fluorocarbon polymer to said copolymer of vinylidene chloride at a temperature from above the decomposition temperature of said copolymer of vinylidene chloride to below the decomposition temperature of said fluorocarbon polymer for a sufficient time for all acid vapors to be evolved, the surface coating being on a priming coating containing chromium oxide, or chromium oxide with chromium, such that the heating decomposes the copolymer to etch the priming coating to key the fluorocarbon polymer to the priming coating.

2. A process as claimed in claim 1, in which the substrate is a metal.

3. A process as claimed in claim 1, in which the heating is carried out in the range 340° to 370°C.

4. A process as claimed in claim 1, in which the heating is stopped when the copolymer has fully decomposed.

5. A process as claimed in claim 1 in which the fluorocarbon polymer is a polytetrafluoroethylene.

6. A process as claimed in claim 1 in which the fluorocarbon polymer is a copolymer of tetrafluoroethylene and hexafluoropropylene.

7. A process as claimed in claim 1 in which the fluorocarbon polymer is a polychlorotrifluoroethylene.

8. A process as claimed in claim 1 in which the fluorocarbon polymer is a polyvinylidenefluoride.

9. A process as claimed in claim 8 in which the surface coating had been formed by application of a fluid dispersion containing the fluorocarbon polymer and the vinylidene chloride copolymer.

10. A process as claimed in claim 9, in which the fluid dispersion is a dispersion, in a liquid that may be volatilized, of a polytetrafluoroethylene and a vinylidene chloride copolymer, and wherein the copolymer corresponds to 95 to 70 percent by weight of vinylidene chloride and 5 to 30 percent by weight of copolymerizable ethylenically unsaturated monomeric material.

11. A process as claimed in claim 9, in which the fluid dispersion is an aqueous dispersion.

12. A process as claimed in claim 11, in which the aqueous dispersion contains (a) a polytetrafluoroethylene in the form of approximately spherical colloidal particles having an average diameter of 0.15 to 0.20 and $\mu$ and containing 6 percent by weight of a polymeric non-ionic surface active agent; and (b) a copolymer of vinylidene chloride, acrylonitrile and acrylic acid.

13. A process as claimed in claim 12, in which the aqueous dispersion contains 45 to 65 percent by weight of the polytetrafluoroethylene and 55 to 35 percent by weight of the vinylidene chloride copolymer.

14. A process as claimed in claim 1 in which the priming coating is an electrochemically deposited coating.

15. A process as claimed in claim 14, in which the priming coating consists of chromium oxide in hydrated form.

16. A process as claimed in claim 14, in which the priming coating has a composite structure with chromium metal adjacent to the substrate and chromium oxide in hydrated form on top.

17. A process as claimed in claim 1, in which the heating is at a temperature at which said fluorocarbon polymer begins to fuse or sinter to below the decomposition temperature of said fluorocarbon polymer.

18. A process as claimed in claim 1, in which said ethylenically unsaturated monomers copolymerizable with said vinylidene chlorides are (a) monoethylenically unsaturated mono- or poly-carboxylic acids and their esters, anhydrides and nitriles, (b) esters of mono- or poly-carboxylic fatty acids and mono-ethylenically unsautrated alcohols, (c) halogen-substituted derivatives of ethylene, (d) mono-ethylenically unsaturated aldehydes and ketones, or (e) dienes.

19. A process as claimed in claim 18, wherein said ethylenically unsaturated monomers are acrylic acid, α-chloro-acrylic acid, methacrylic acid, maleic acid, fumaric acid, crotonic acid, mesaconic acid, aconitic acid, itaconic acid, and their esters, anhydrides and nitriles, vinyl esters of mono-carboxylic fatty acids, vinyl halides, methacrolein, vinylmethylketone, isoprene or butadiene.

20. A fluorocarbon polymer coated substrate in which the fluorocarbon polymer is keyed to an etched surface of a priming coating having a composite structure with chromium metal adjacent to the substrate and chromium oxide in hydrated form on top.

* * * * *